Nov. 17, 1931.    J. MAYER    1,832,405
VEHICLE WHEEL
Filed April 17, 1929
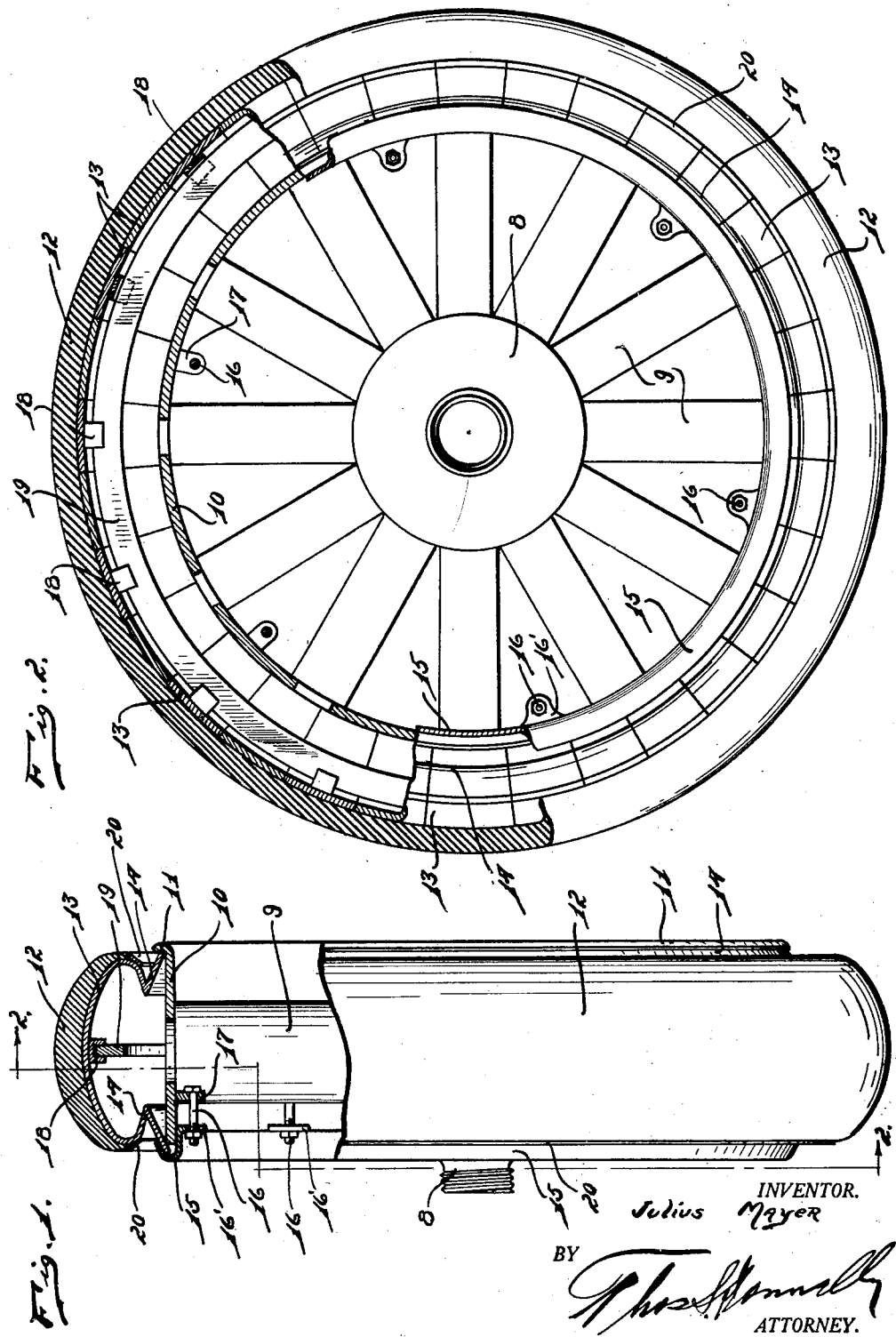
INVENTOR.
Julius Mayer
BY
Thos. S. Hannelly
ATTORNEY.

Patented Nov. 17, 1931

1,832,405

UNITED STATES PATENT OFFICE

JULIUS MAYER, OF DETROIT, MICHIGAN

VEHICLE WHEEL

Application filed April 17, 1929. Serial No. 355,748.

My invention relates to a new and useful improvement in a vehicle wheel and has for its object the provision of a wheel whereby a solid rubber tire may be used and a yieldable effect produced on the wheel.

Another object of the invention is the provision of a novel means for attaching the rubber thread member to the wheel felly in such a manner that radial movement may be effected.

It is another object of the invention to provide a wheel of this class which will be simple of structure, economical of manufacture and highly efficient in use.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention with parts broken away and parts shown in section.

Fig. 2 is an end elevational view of the invention with parts broken away and parts shown in section.

As shown in the drawings, the wheel comprises a hub 8 radiating outwardly from which are spokes 9 which serve to engage the felly forming rim 10 which is preferably formed from metal and curled at one side to provide the retaining flange 11. The tread member or tire comprises the rubber tread portion 12 which is molded on the metallic base 13. The ends of this base are turned to form the V-shaped formation 14 so that the opposite edges of the base after the V-formation are turned outwardly. This outwardly turned end at one side engages the retaining flange 11 and a separable retaining flange 15 is secured to the felly forming rim portion 10 by means of the bolt 16 which are projected through the lugs 17 and 16'. Projecting inwardly from the inner surface of the base 13 at spaced intervals are U-clips 18 which serve as guides or retainers for the metallic ring 19. The base 13 is formed from a plurality of sections positioned side by side so that these sections are movable independently of each other. Guard plates 20 are mounted on the outer side of each of the base forming plates 13 so that the rubber tread 12 may be molded on these sections.

In operation, when the load is placed upon the vehicle wheel and drawn so that the wheel rotates, the various sections will permit a yielding of the tread and particularly where rough roads or bumps are encountered. This strain exerted on the tread and the base plates 13 is because of the presence of the ring 19 spread over the various plates, the ring 19 thus serving as a strain or load distributor. In this manner, there is a distribution of the load over the maximum area of the wheel without diminishing to any extent the resiliency of the wheel.

While I have illustrated and described the preferred form of my invention, I do not wish to limit myself to the precise details of structure shown but desire to avail myself of such variations and modifications as come within the scope of the appended claims.

Having thus described my invention, what I claim as new and desire to secure by Letters Patent is:

1. In a wheel of the class described, having a felly forming rim, the combination of a plurality of metallic sections placed end to end in engagement to form an uninterrupted annular structure and supported at the inner edges on said felly forming rim; a tread mounted on the periphery of said annular structure; and a non-yieldable annular member loosely positioned in embracing relation to said felly forming rim in spaced relation thereto and engaging at its periphery, the inner surface of said annular structure, said annular member having its width extended radially.

2. In a wheel of the class described, having a felly forming rim, the combination of a plurality of metallic sections placed end to end in engagement to form an uninterrupted annular structure and supported at the inner edges on said felly forming rim; a tread mounted on the periphery of said annular structure; a non-yieldable annular member loosely positioned in embracing relation to said felly forming rim in spaced relation thereto and engaging at its periphery the inner surface of said annular structure, said annular member having its width extended radially; and a plurality of U shaped clips fixedly mounted on the inner surface of said annular structure and having the legs projecting radially inwardly therefrom for embracing, in loose relation, said non-yieldable annular member.

In testimony whereof I have signed the foregoing specification.

JULIUS MAYER.